United States Patent
Safir

(10) Patent No.: US 9,617,756 B2
(45) Date of Patent: Apr. 11, 2017

(54) LUGGAGE HANDLING CONTROL INSTALLATION

(71) Applicant: SBS, Evry (FR)

(72) Inventor: André Safir, Rueil-Malmaison (FR)

(73) Assignee: SBS (FR)

( * ) Notice: Subject to any disclaimer, the term of this patent is extended or adjusted under 35 U.S.C. 154(b) by 0 days.

(21) Appl. No.: 14/907,207

(22) PCT Filed: Jul. 25, 2014

(86) PCT No.: PCT/FR2014/051938
§ 371 (c)(1),
(2) Date: Jan. 22, 2016

(87) PCT Pub. No.: WO2015/011426
PCT Pub. Date: Jan. 29, 2015

(65) Prior Publication Data
US 2016/0159498 A1    Jun. 9, 2016

(30) Foreign Application Priority Data

Jul. 25, 2013   (FR) ..................................... 13 57335

(51) Int. Cl.
*E05B 35/10* (2006.01)
*E05B 65/00* (2006.01)
(Continued)

(52) U.S. Cl.
CPC ............ *E05B 35/105* (2013.01); *B64F 1/366* (2013.01); *B64F 1/368* (2013.01); *E05B 39/00* (2013.01);
(Continued)

(58) Field of Classification Search
CPC .............................. E05B 65/00; E05B 35/105
See application file for complete search history.

(56) References Cited

U.S. PATENT DOCUMENTS

| 6,420,971 B1* | 7/2002 | Leck ....................... E05B 39/04 |
| | | 340/542 |
| 7,021,537 B2* | 4/2006 | Tropp ................... E05B 35/105 |
| | | 235/384 |

(Continued)

FOREIGN PATENT DOCUMENTS

| EP | 0 520 455 A2 | 12/1992 |
| FR | 2 975 078 A1 | 11/2012 |

OTHER PUBLICATIONS

International Search Report dated Oct. 29, 2014 issued in corresponding International patent application No. PCT/FR2014/051938.
(Continued)

*Primary Examiner* — Thomas Randazzo
(74) *Attorney, Agent, or Firm* — Ostrolenk Faber LLP

(57) ABSTRACT

A control installation for handling luggage (10) in a handling space (32). The handling space (32) has a reception entrance and a discharge exit. Said installation includes a plurality of locking devices (12, 14) to enable each of said pieces of luggage to be kept locked when said luggage is received at said reception entrance. Each of said locking devices (12, 14) includes a control transmitter capable of transmitting an identification signal (36) and an unlocking signal (38) when said locking device (12, 14) is unlocked, while said handling space (32) comprises control receivers (34) to receive, on the one hand, said identification signal (36), and, on the other hand, said unlocking signal (38).

8 Claims, 1 Drawing Sheet

(51) Int. Cl.
*E05B 47/06* (2006.01)
*E05B 39/00* (2006.01)
*B64F 1/36* (2017.01)
*G06K 7/10* (2006.01)

(52) U.S. Cl.
CPC .............. *E05B 47/06* (2013.01); *E05B 65/00* (2013.01); *G06K 7/10009* (2013.01)

(56) References Cited

U.S. PATENT DOCUMENTS

| | | | | |
|---|---|---|---|---|
| 8,171,760 | B2* | 5/2012 | Yen | E05B 35/105 70/21 |
| 8,643,486 | B2* | 2/2014 | Hess | G08B 13/1409 340/508 |
| 9,121,199 | B2* | 9/2015 | Li | E05B 47/06 |
| 9,196,136 | B2* | 11/2015 | King | G08B 13/06 |
| 2006/0022090 | A1 | 2/2006 | McCoskey et al. | |
| 2008/0256991 | A1* | 10/2008 | Goldman | E05B 39/00 70/57.1 |
| 2010/0018839 | A1* | 1/2010 | Tan | B64F 1/366 198/507 |
| 2013/0255335 | A1* | 10/2013 | Jonely | E05B 47/0001 70/277 |
| 2013/0264128 | A1* | 10/2013 | Plato | E05B 39/00 177/132 |
| 2014/0002239 | A1* | 1/2014 | Rayner | G08B 13/1427 340/5.61 |
| 2014/0109631 | A1* | 4/2014 | Asquith | E05B 45/005 70/15 |
| 2014/0150502 | A1* | 6/2014 | Duncan | G07C 9/00309 70/20 |

OTHER PUBLICATIONS

Written Opinion dated Oct. 29, 2014 issued in corresponding International patent application No. PCT/FR2014/051938.

* cited by examiner

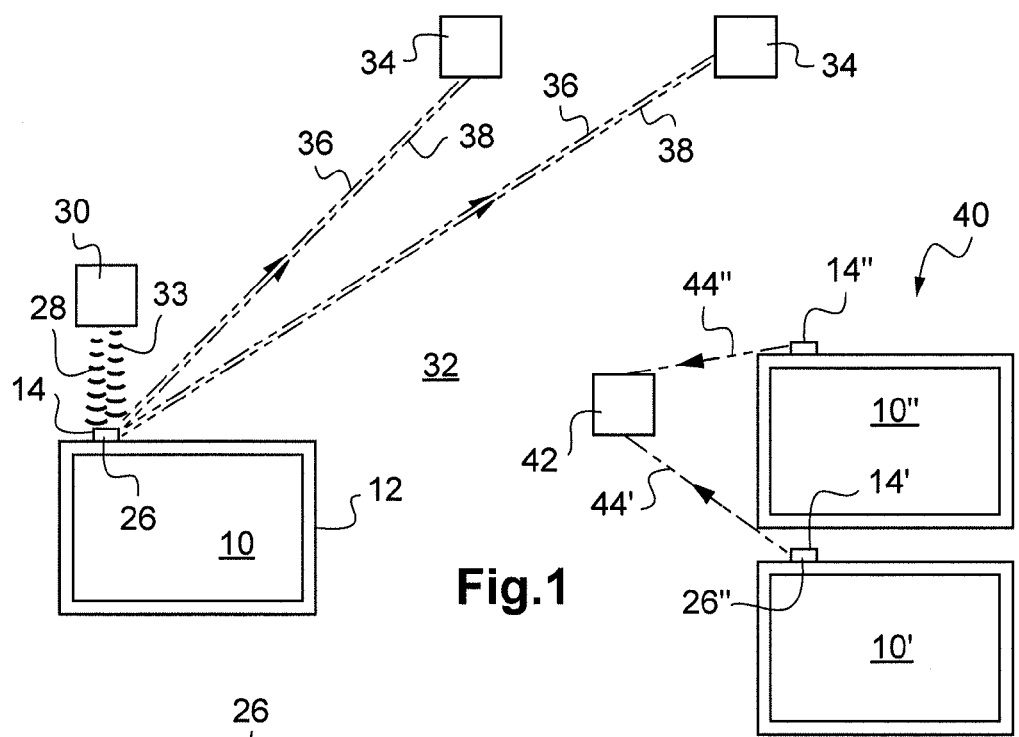
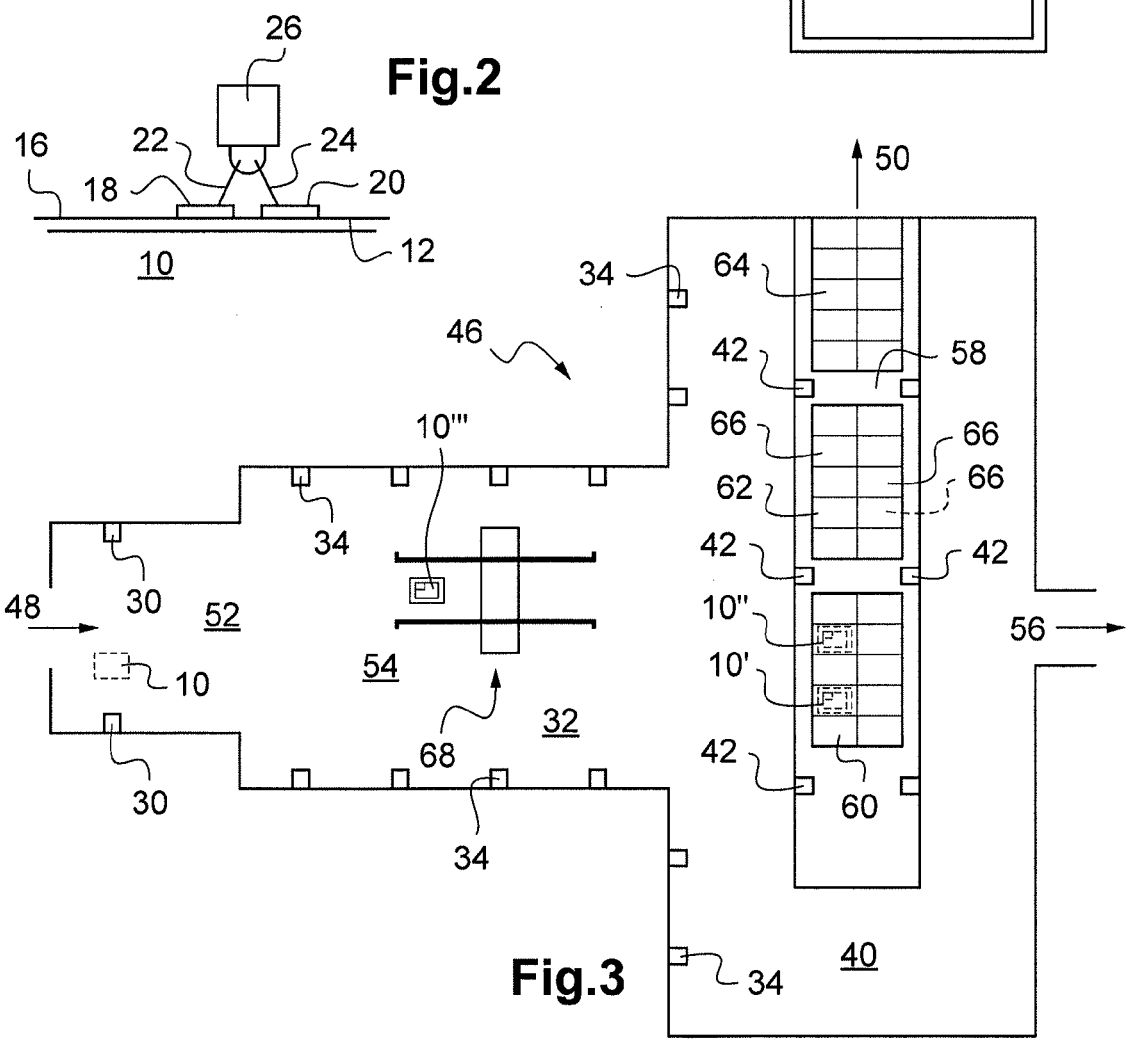

LUGGAGE HANDLING CONTROL INSTALLATION

CROSS REFERENCE TO RELATED APPLICATIONS

The present application is a 35 U.S.C. §371 National Phase conversion of PCT/FR2014/051938, filed Jul. 25, 2014, which claims benefit of French Application No. 1357335, filed Jul. 25, 2013, the disclosure of which is incorporated herein by reference. The PCT International Application was published in the French language.

TECHNICAL FIELD OF THE INVENTION

The present invention relates to an installation for controlling luggage handling in a handling space, notably, but not exclusively, for air transport.

A proposed field of application is that of controlling luggage handling in an air terminal, between the checking in of a piece of luggage by the passenger and the retrieval of said luggage in another air terminal after the flight.

BACKGROUND OF THE INVENTION

The efficiency of luggage processing and control on the ground can increase aircraft turnaround and consequently reduce the unit passenger transport cost.

Generally, immediately after check-in at an air terminal, luggage is taken out of passengers' control and is carried on conveyor belts to be inspected and then deposited in bulk in containers. These containers themselves are then transported to the aircraft and loaded into its hold.

Given the numerous types of luggage, in terms of both shape and weight, and the size of the handling means to be used between check-in and the aircraft, it is not easy to propose a rational system for controlling the luggage with the aim of automation and optimization of the available space.

Thus it has been proposed that luggage be made more uniform in terms of their size, so that they can be transported in groups in containers. The containers are then placed on storage frames for the purpose of making them available to passengers at the air terminals on the one hand, and conveying them to the aircraft on the other hand. It has also been proposed that each piece of luggage be identified by an encoded RFID tag and that the acceptance or reclamation of luggage be made conditional on the recognition of the tag code.

Reference may be made to the document FR2975078, which describes an installation of this type. However, it has been found necessary to increase the security of the conditions for loading and reclamation of luggage by passengers and to reduce the costs of these handling control installations.

Thus one problem which arises and which the present invention is intended to overcome is that of providing a more secure handling installation.

SUMMARY OF THE INVENTION

To this end, the present invention proposes an installation for luggage handling control in a handling space for air transport, said handling space having a reception entrance for receiving a plurality of pieces of luggage and a discharge exit for discharging said plurality of pieces of luggage, said installation further comprising a plurality of locking devices, each of said locking devices being capable of being mounted on a piece of luggage of said plurality of pieces of luggage so that each of said pieces of luggage can be kept locked, when said luggage is received at said reception entrance. According to the invention, each of said locking devices comprises a control transmitter capable to of transmitting an identification signal and an unlocking signal when said locking device is unlocked, while said handling space comprises control receivers to receive, on the one hand, said identification signal for supplying the position of the locking device within said handling space, and, on the other hand, said unlocking signal.

Thus one characteristic of the invention is the use of a locking device equipped with a control transmitter which is adapted to transmit, in the handling space, both an identification signal and a signal relating to its locked or unlocked state. Preferably, the identification signal is continuous, while the signal relating to its state is transmitted only when the locking device is unlocked. The handling space is also equipped with control receivers for receiving the signals transmitted by the control transmitter, making it possible to detect within the handling space whether the locking device is in an unlocked state, and consequently whether the luggage has been opened, as well as the position of the locking device and consequently that of the luggage that has been thus opened.

Therefore, starting from the reception entrance of the handling space, where the luggage is checked and sealed by means of the locking device, and up to the discharge exit, the luggage, by means of the fitted locking device, is identified in the handling space, while its open or closed state is also indicated. Evidently, the same applies, simultaneously, to all the sealed luggage circulating in the handling space. This installation can be used to improve the security of luggage control at air terminals. It will be noted that the luggage is transported by its owners themselves from the reception entrance to the discharge exit, enabling luggage handling costs to be reduced.

According to a particularly advantageous embodiment of the invention, the installation further comprises a trigger transmitter located at said reception entrance so that it can transmit an activation signal for activating said control transmitter of each of said locking devices. Thus the control transmitter housed in the locking device transmits identification signals and signals indicating the locked or unlocked state of the locking device, from the reception entrance onward, and preferably after the contents of the luggage have been checked.

Said trigger transmitter is preferably also capable of transmitting a loading signal representing said identification signal. Thus the information on the carrier of the luggage and its destination can be loaded automatically into the control transmitter so that it can then transmit the identification signal in the handling space.

According to a particularly advantageous embodiment of the invention, the installation further comprises a plurality of ordered locations situated near said discharge exit, each of the locations being capable of receiving a single piece of luggage fitted with a locking device. Thus each luggage owner, or passenger, carries his luggage himself into a location which is, for example, pre-booked, at the time of the reception of the luggage at the reception entrance, and, for example, simultaneously with the transmission of the loading signal representing the identification signal.

The installation further comprises location receivers for the purpose of supplying the relative position of said locking devices identified within said locations. The location receivers are situated near the discharge exit, and can be used to identify the locking members and their corresponding luggage, on the basis of the identification signal that they transmit, as well as their positions in the locations. It is therefore easy to verify that each piece of luggage presented at the reception entrance is actually present in the location assigned to it at the discharge exit. Furthermore, it is possible to verify that the luggage has not been opened between the reception entrance and the discharge exit. Thus the luggage handling, although it is partially carried out by the luggage owners in the handling area, is fully monitored.

Preferably, the installation comprises a storage frame situated near said discharge exit, said plurality of locations being formed within said storage frame. The storage frame is then equipped with location receivers to provide better location of the locking devices, and consequently of the associated luggage.

It should be noted that the method of locating the locking devices in the handling space by means of the control receivers is less precise than the method using location receivers. The control receivers and control transmitters communicate with one another by means of an electromagnetic radiation protocol at a given frequency, in the radio frequency range for example, whereas the location receivers and the control transmitters communicate with one another by means of a low-frequency electromagnetic radiation protocol.

Advantageously, the installation further comprises containers, and said locations are arranged inside said containers. Thus the containers in which the locations are arranged are intended to be installed along a longitudinal direction, within the storage frame. The containers and the locations are open laterally, and the frame itself is open, so that the passengers can themselves load their luggage laterally into the locations. When the loading of the containers is complete, they are removed from the frame in said longitudinal direction and are then transferred to the hold of an aircraft.

According to a particularly advantageous embodiment of the invention, said locking devices each comprise a receptacle having an opening for receiving a piece of luggage and a sealing member to enable said opening to be sealed. Thus, at the reception entrance, each piece of luggage is inserted into a receptacle through the opening. The opening is then reclosed, for example by means of a sliding shutter, and then sealed by means of the sealing member which prevents the opening of the receptacle.

Said control transmitter is also housed in said sealing member. Thus, after the sealing member has been put in place, the luggage and the receptacle are presented in the vicinity of the trigger transmitter so that, by transmitting signals according to a suitable communications protocol, it can transmit to the control transmitter the activation signal of the control transmitter and the signal representing the identification signal. The luggage is then under control because of the control receivers.

According to a particularly advantageous embodiment, said receptacle has a depressurized double-skin wall, and said control transmitter is also adapted to supply a pressure signal to said control receivers when the pressure of said double-skin wall increases. Thus, if the double-skin wall is pierced, the pressure rises inside the skin, causing the activation of the control transmitter, which, in the same way as in the case of unlocking, transmits a break-in signal which is received by the control receivers.

According to another aspect, the invention relates to a method of luggage handling control in a handling space for air transport, said handling space having a reception entrance for receiving a plurality of pieces of luggage and a discharge exit for discharging said plurality of pieces of luggage, said installation being of the type in which a plurality of locking devices is also provided, each of said locking devices being capable of being mounted on a piece of luggage of said plurality of pieces of luggage so that each of said pieces of luggage can be kept locked, when said luggage is received at said reception entrance. According to the invention, each of said locking devices is equipped with a control transmitter capable of transmitting an identification signal and a locking signal when said locking device is unlocked, and control receivers are provided in said handling space to receive, on the one hand, said identification signal for supplying the position of the locking device within said handling space, and, on the other hand, said unlocking signal.

According to another object, the present invention proposes an installation for luggage handling control in a handling space for air transport, said handling space having a reception entrance for receiving a plurality of pieces of luggage and a discharge outlet for discharging said plurality of pieces of luggage, said installation further comprising a plurality of locking devices, each of said locking devices being capable of being mounted on a piece of luggage of said plurality of pieces of luggage so that each of said pieces of luggage can be kept locked, when said luggage is received at said reception entrance; said installation further comprising a plurality of locations situated near said discharge exit, each of the locations being capable of receiving a piece of luggage equipped with a locking device, while each of said locking devices comprises a control transmitter capable of transmitting an identification signal, said installation further comprising location receivers for supplying the relative positions of said locking devices identified in said locations.

According to this further object, said control transmitter is capable of transmitting an unlocking signal when said locking device is unlocked, while said handling space comprises control receivers to receive, on the one hand, said identification signal for supplying the position of the locking device within said handling space, and, on the other hand, said unlocking signal.

BRIEF DESCRIPTION OF THE DRAWINGS

Other distinctive features and advantages of the invention will be evident from a reading of the following description of a specific embodiment of the invention, provided for guidance in a non-limiting way, with reference to the attached drawings, in which:

FIG. 1 is a synoptic diagram of the operation of a luggage handling control installation according to the invention;

FIG. 2 is a detail view of FIG. 1; and

FIG. 3 is a schematic view of a luggage handling control installation according to the invention.

DESCRIPTION OF EMBODIMENTS

FIG. 1 shows a first case 10, or piece of luggage, housed in a receptacle 12, which is closed by a sealing member 14. The receptacle 12 and the sealing member 14 form a locking device capable of locking the piece of luggage 10. The receptacle 12 is formed by a bag matched to the shape and size of the largest commonly used pieces of luggage. The walls of the bag are made of a reinforced polymeric material which is highly resistant to the impact of a pointed and/or cutting implement. A variant execution of the wall of the bag of the receptacle 12 for further improving the security conditions is described below. The bag 12 has an opening closed by a shutter closure 16 having two sliders 18 and 20, shown in detail in FIG. 2. Each slider has a pierced pull rod 22 and 24, these pull rods being joined by an electronic padlock 26 shown schematically in FIG. 2. Thus the locking device, and in particular the sealing member 14, comprises the electronic padlock 26.

The electronic padlock 26 includes a radio tag or transponder, belonging to the category of active tags which also include batteries for their power supply. The radio tag comprises an integrated circuit or electronic chip associated with an antenna. Thus the radio tag can not only receive signals, but can also use a control transmitter to transmit a continuous identification signal with the need for remote power supply by the signal of a reader/receiver.

Additionally, the electronic padlock 26 intrinsically forms a mechanical connection between the two pull rods 22 and 24, and if this connection is broken the radio tag can transmit another signal, namely an unlocking signal, via said control transmitter, indicating that the receptacle 12, and therefore the luggage 10, may have been broken into.

The radio tag can remain in a sleep state; that is to say, it does not transmit any signal. However, it can receive an activation signal from a trigger transmitter, for the activation, notably, of the control transmitter. In addition to activation, the trigger transmitter can supply the memory of the control transmitter with a loading signal representing identification elements relating, notably, to the owner of the luggage and his travel schedule, particularly his flight schedule in the case of air transport.

According to a preferred embodiment of the invention, the trigger transmitter transmits electromagnetic signals in a high-frequency mode to the integrated circuit of the radio tag. The high-frequency band normally used for radio tags is 13.56 MHz. By this means, the trigger transmitter transmits signals capable of activating the control transmitter and transmitting the identification elements to the memory of the control transmitter, so that it can transmit a corresponding identification signal.

However, the control transmitter does not transmit an identification signal at high frequency, but in a radio frequency mode, particularly in the 2.45 GHz frequency band. In the same way, the unlocking signal, if transmitted, is transmitted in the same frequency band.

Thus, referring again to FIG. 1, a detailed description will now be given of the transmission and reception options for the radio tag of the electronic padlock 26 forming part of the sealing member 14 in a given environment. An example of an environment associated with luggage handling in an air terminal will then be described with reference to FIG. 3.

Thus, the radio tag of the electronic padlock 26 can receive an activation signal 28 from a trigger transmitter 30 installed in a fixed position in a given handling space 32. Thus, immediately after the luggage 10 has been locked by the receptacle 12 and the sealing member 14, the control transmitter of the radio tag is activated. Additionally, the trigger transmitter 30 supplies the identification elements of the luggage 10 to the memory of the control transmitter, using a loading signal 33. The luggage 10 is then intended to be conveyed within the handling space 32 by the carrier of the luggage himself.

The handling space 32 is also equipped with control receivers 34, installed in fixed positions, preferably on the ceiling of the handling space 32. They are installed way so as to progressively cover the whole of the handling space 32. Thus the control receivers 34 receive an identification signal 36 from the control transmitter of the radio tag housed in the electronic padlock 26. Because of the network formed in the handling space 32, the position of the electronic padlock 26 and therefore of the luggage 10 in the handling space 32 can be determined to the nearest meter. Furthermore, the control receivers 34 can receive an unlocking signal 38 when the electronic padlock 26 is unlocked. Thus, if an attempt to open the luggage is detected by means of the unlocking signal 38, the location of the luggage 10 in the handling space 32 can be ascertained at the same time, and human intervention by a security service can be initiated in order to verify the intentions of the luggage owner.

Clearly, all the pieces of luggage conveyed in the handling area 32 are equipped with the same locking devices, although their radio tags are loaded with different identification elements.

Within the handling space 32, a storage zone 40 can be used to store the prepared luggage before loading. In this storage zone 40, the luggage 10', 10" is arranged and ordered in relative positions. This storage zone 40 is therefore equipped with location receivers 42. The control transmitter of the radio tag also transmits its identification elements in a low-frequency identification signal 44', 44", so that the location receivers 42 can accurately locate the positions of the pieces of luggage 10', 10" relative to one another, on the basis of the orientation and intensities of the low-frequency signals 44', 44" received. This location can then be performed with an accuracy of about a centimeter.

Reference will now be made to FIG. 3 which shows part of an air terminal concourse 46, which has a reception entrance 48 and an opposing discharge exit 50. The air terminal concourse 46 defines the handling space 32, which is divided into three zones, namely a luggage locking zone 52, a luggage control zone 54 and the storage zone 40. At the reception entrance 48, the passengers, with their luggage, enter the luggage locking zone 52. The prepared luggage is discharged from the storage zone 40 via the discharge exit 50, while the passengers pass out, without their luggage, via a passenger exit 56.

The storage zone 40 comprises a longitudinal storage frame 58 in which containers 60, 62 and 64 are engaged. The storage frame 58 and the containers 60, 62, 64 have opposing lateral openings. Each of the containers 60, 62, 64 has locations 66 which are superimposed and juxtaposed, each of which can receive a single piece of luggage 10', 10".

Thus FIG. 3 shows the trigger transmitters 30 in the luggage locking zone 52, the control receivers 34 in the luggage control zone 54 and the storage zone 40, and the location receivers 42 on the storage frame 58.

Thus each passenger, with his luggage 10, passes through the reception entrance 48, inserts his luggage into the receptacle 12, and closes the latter by means of the sealing member 14. The luggage 10 is then brought near to the trigger transmitter 30, at a distance of several centimeters for example, so as to activate the control transmitter of the radio tag and transmit identification information to it, concerning the embarkation card for example.

Having been locked and monitored in this way, the luggage is conveyed by the passenger himself into the luggage control zone 54. It is then placed into a scanner 68, for example. At the exit from the scanner 68, the passenger collects his luggage and then places it in a location 66 in one of the containers 60, 62, 64. The luggage and its locking device, which have hitherto been monitored by the control receivers 34, are then additionally monitored by the location receivers 42. However, it remains active in relation to the control receivers 34, so that the unlocking signal can be detected.

Thus every passengers carries his luggage from the reception entrance 48 to the location 66 in one of the containers 60, 62, 64. Between these two points, the luggage and its locking system are constantly monitored in respect of its position and the locked or unlocked state of the locking device. It is also easy to verify that all the luggage identified in the luggage locking zone 52 is actually present in the containers 60, 62, 64. Thus if no unlocking signal has been recorded during the process of handling all the luggage, none of the passengers will have been able to place anything in the luggage, or remove anything from it.

The containers 60, 62, 64 and the luggage contained in them are then discharged via the discharge exit 50. During this discharge, the radio tags of the to electronic padlocks of all the luggage are put into the sleep state. The containers 60, 62, 64 are then ready to be loaded into the hold of an aircraft.

After the flight, the containers 60, 62, 64 are unloaded and placed on the storage frame at the destination air terminal. During this process, the radio tags are reactivated so that the passengers can locate their luggage. This can be done because the destination air terminal is equipped with the same location receivers 42 and control receivers 34, and also with display panels for displaying the location of the luggage equipped with its locking devices in the locations 66 of the containers 60, 62, 64. Immediately after their luggage has been identified, the passengers come to collect it and then leave the destination air terminal.

In order to improve further the security and control of passengers' access to their luggage during luggage handling, and according to another variant embodiment of the wall of the bag of the receptacle 12, this bag has a sealed double-skin wall. The sealed double skin is also depressurized and is equipped with a pressure sensor capable of supplying a signal representing the internal pressure of the double skin. The pressure sensor is then connected to the control transmitter, which can supply a pressure signal to the control receivers, if the double-skin wall is pierced and its internal pressure increases. Thus, if the wall of the bag of the receptacle 12 is pierced between the luggage locking zone 52 and the storage zone 40, the control receivers 34 detect a break-in signal. The position of the locking device in the handling space 32 can then be detected.

The depressurization of the double-skin wall is more advantageous than pressurization, for reasons of overall dimensions. However, the depressurization tends to cause one of the two skins of the wall to press against the other, making it difficult to detect the pressure variation. Accordingly, protuberant air-filled hemispheres are progressively inserted into the double-skin wall so as to ensure the free circulation of the air over the whole extent of the wall.

Preferably, the pressure sensor is installed in the electronic padlock, which is then held in a fixed position against the wall.

What is claimed is:

1. An installation for luggage handling control in a handling space for air transport, said handling space having a reception entrance for receiving a plurality of pieces of luggage and a discharge exit for discharging said plurality of pieces of luggage, said installation comprising:
    a plurality of locking devices, wherein each locking device of said locking devices is configured to secure a piece of luggage of said plurality of pieces of luggage so that each of said piece of luggage is locked after said luggage passes said reception entrance,
    wherein each locking device of said locking devices comprises a control transmitter configured to transmit an identification signal and an unlocking signal when said locking device is unlocked;
    control receivers positioned in the handling space and configured to receive, on the one hand, said identification signal for supplying a position of the locking device within said handling space, and, on the other hand, said unlocking signal; and
    a plurality of locations situated near said discharge exit, each location of the plurality of locations being configured to store a single piece of luggage secured by a locking device.

2. The control installation as claimed in claim 1, further comprising location receivers configured to supply a position of said locking devices identified within said plurality of locations.

3. The control installation as claimed in claim 1, further comprising a storage frame situated near said discharge exit, said plurality of locations being formed within said storage frame.

4. The control installation as claimed in claim 1, further comprising a container,
    wherein said plurality of locations are arranged inside said container.

5. The control installation as claimed in claim 1, further comprising a trigger transmitter located at said reception entrance and configured to transmit an activation signal for activating said control transmitter of each of said locking devices.

6. The control installation as claimed in claim 5, wherein said trigger transmitter is configured to transmit a loading signal representing said identification signal.

7. An installation for luggage handling control in a handling space for air transport, said handling space having a reception entrance for receiving a plurality of pieces of luggage and a discharge exit for discharging said plurality of pieces of luggage, said installation comprising:
    a plurality of locking devices, each locking device of said locking devices configured to secure a piece of luggage of said plurality of pieces of luggage, so that each of said pieces of luggage is locked after said luggage passes said reception entrance,
    each locking device comprises:
    a control transmitter configured to transmit an identification signal and an unlocking signal when said locking device is unlocked,
    a receptacle having an opening for receiving a piece of luggage, said receptacle comprising a depressurized, sealed, double-skin wall, and
    a sealing member configured to seal said opening;
    control receivers positioned in the handling space and configured to receive (1) said identification signal for supplying a position of the locking device within said handling space, and (2) said unlocking signal; and
    wherein said control transmitter is configured to supply a pressure signal to said control receivers when pressure of said double-skin wall increases.

8. The control installation as claimed in claim 7, wherein said control transmitter is housed in said sealing member.

* * * * *